Aug. 18, 1970     K. W. SWAIN     3,525,064
POLYPHASE FUSE STRUCTURE FOR CONTROLLING PROTRACTED
OVERLOAD CURRENTS AND MAJOR FAULT CURRENTS
Filed Jan. 9, 1968     3 Sheets-Sheet 1
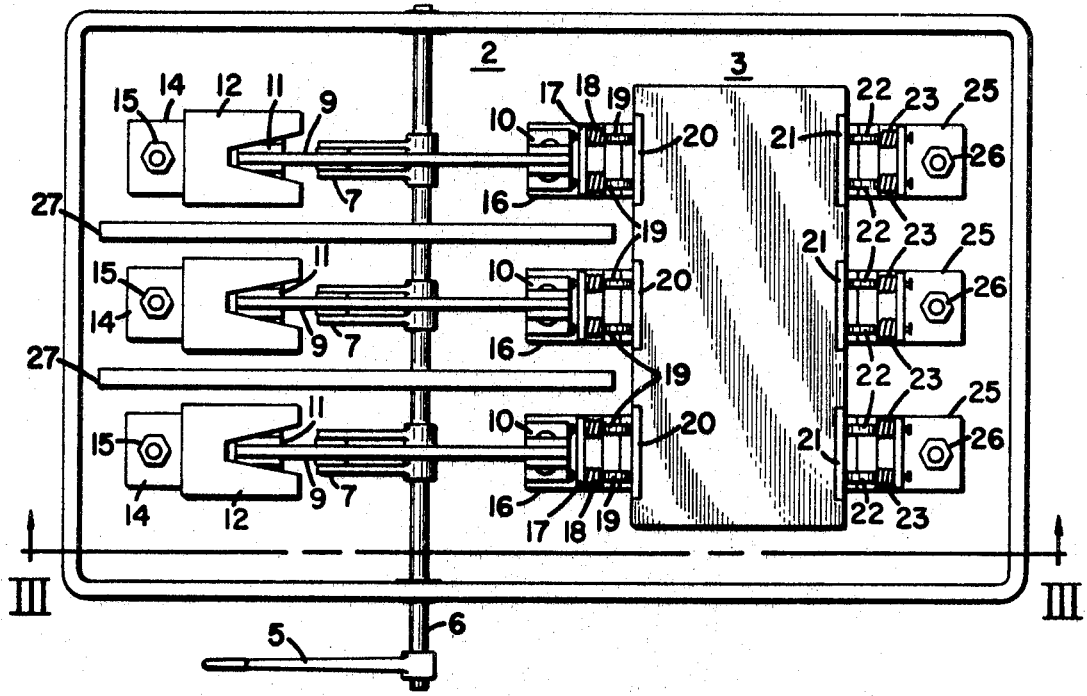
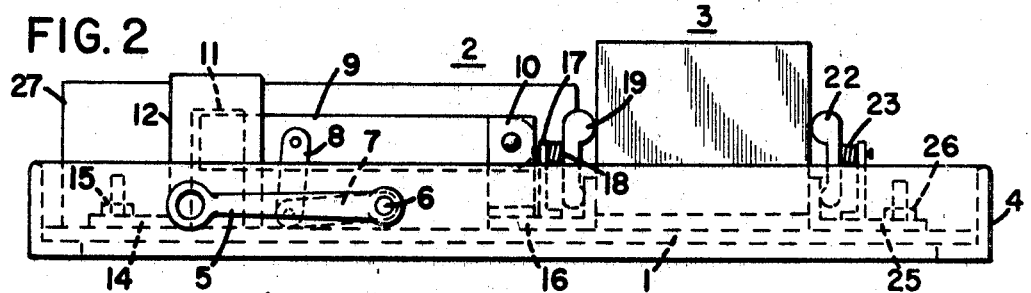
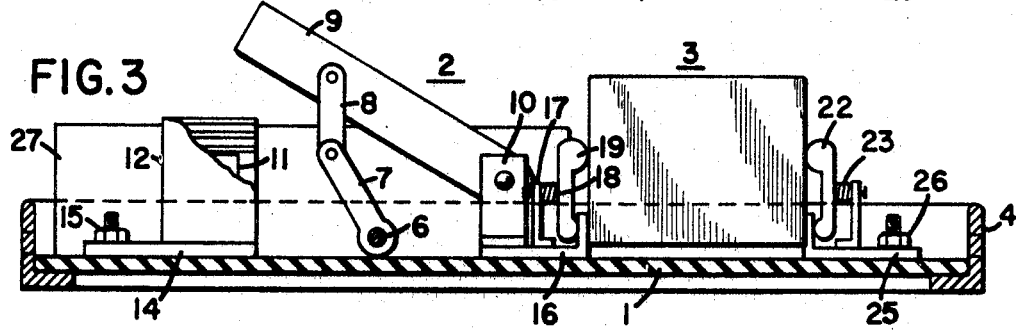
INVENTOR:
KENNETH W. SWAIN
BY
ATTY.

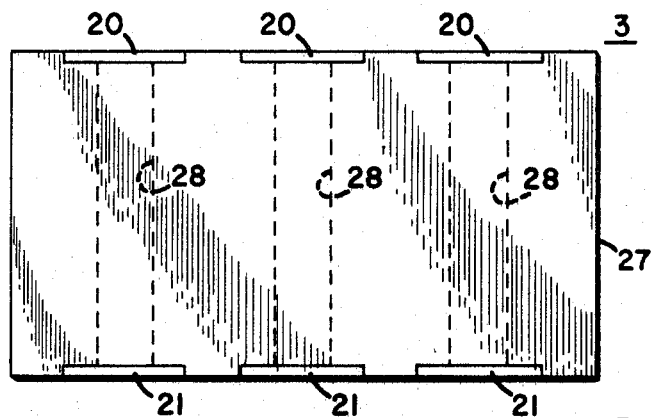
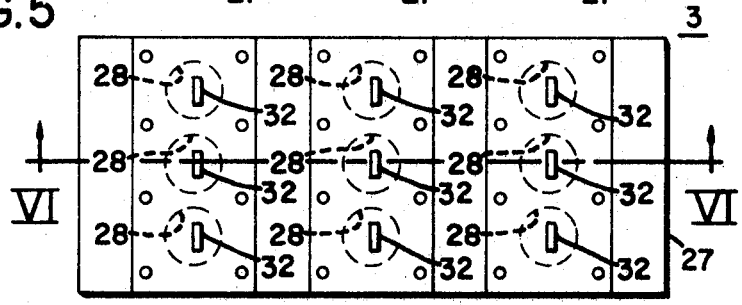
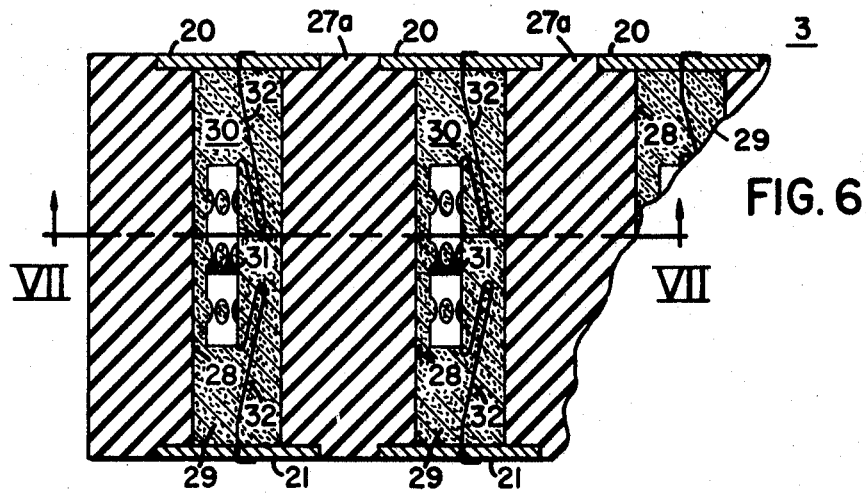
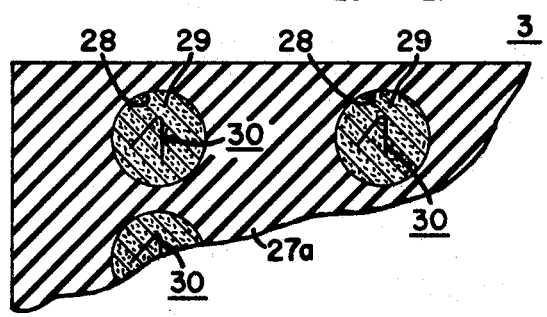

United States Patent Office 3,525,064
Patented Aug. 18, 1970

3,525,064
POLYPHASE FUSE STRUCTURE FOR CONTROL-
LING PROTRACTED OVERLOAD CURRENTS
AND MAJOR FAULT CURRENTS
Kenneth W. Swain, Hampton Falls, N.H., assignor to
The Chase-Shawmut Company, Newburyport, Mass.
Filed Jan. 9, 1968, Ser. No. 696,556
Int. Cl. H01h 71/14, 71/20, 73/22
U.S. Cl. 337—146
11 Claims

ABSTRACT OF THE DISCLOSURE

A polyphase fuse, and more particularly a three phase fuse, of utmost compactness for controlling overload currents in addition to major fault currents, or short-circuit currents.

In order to cause all three to form breaks substantially simultaneously on occurrence of small overload currents the outer fuse link means are adapted to have a smaller minimum fusing current than the inner fuse link means arranged between the outer fuse link means.

Further described is a combination of a load-break disconnect switch and a polyphase fuse.

BACKGROUND OF INVENTION

Polyphase fuses are structural units formed by integrating a plurality of single-phase fuses into a unitary structure capable of protecting several phases of a polyphase circuit, generally the phases R, S, T of a three phase circuit. Polyphase fuses can be designed to be more compact than a comparable number of single phase fuses, and they can be replaced upon blowing more quickly than several separate single phase fuses. Thus the application of polyphase fuses greatly reduces the downtime involved in case of replacement of blown fuses.

United States Pat. 3,319,027 to P. C. Hitchcock, May 7, 1967, for Encapsulated Fuse Structure for Polyphase Circuits and U.S. Pat. 3,342,962 to F. J. Kozacka, Sept. 19, 1967, for Supercompact Polyphase Fuse, both assigned to the same assignee as the present invention, are typical examples of polyphase fuse structures.

Heretofore polyphase fuses were used primarily for short-circuit backup protection of circuit breakers having a relatively limited interrupting capacity. For that particular application each of the several single phase fuse units integrated into a composite polyphase fuse structure is designed to have the same melting $i^2 \cdot t$ value and this is achieved with a sufficient degree of precision by combining a plurality of virtually identical fuse structures having virtually identical fuse link means into a unitary polyphase fuse structure.

Serious complications arise, however, when attempting to combine several fuses designed to provide both overload protection and short-circuit protection into a compact integral polyphase fuse. If the common housing is very compact and made of a good thermal conductor rather than a thermal insulator, for instance, of densified asbestos cement rather than of a synthetic resin, and if the pulverulent arc-quenching filler is a good thermal conductor, and if the fuse links are severed at relatively low temperatures by the action of a low fusing point fuse-link-severing overlay, then there is a tendency of thermal imbalance between the constituent units of the polyphase fuse, precluding proper operation thereof. Considering a polyphase fuse for a three phase circuit R, S, T including three narrowly spaced fuse units which are thermally not well insulated from each other, the three units being aligned or arranged linearly, the fuse structures for the phases R and T being arranged at the ends of the line and the fuse structure for the phase S being arranged between the fuse structures for the phases R and T, and assuming the fuse structures for phases R, S, T to be identical, then owing to the fact that the fuse structures for phases R and T are relatively well cooled and the fuse structure for phase S is thermally relatively well insulated by the fuse structure for phases R and T, the fuse structure for phase S has a time-current characteristic which differs significantly from the time-current characteristic of the fuse structures for phases R and T.

It is the principal object of this invention to provide a compact polyphase fuse for three phases capable of controlling overload currents in addition to major fault currents, wherein the fuse structures for all three phases R, S, T have substantially the same time-curent characteristic and sufficiently close melting $i^2 \cdot t$ values to blow virtually simultaneously on occurrence of major fault currents.

Another object of this invention is to achieve this end by relatively simple means.

SUMMARY OF INVENTION

Polyphase fuses embodying this invention include a casing of electric insulating material defining at least three separate aligned compartments including at least two outer compartments and an inner compartment arranged between the two outer compartments. Separate bodies of a pulverulent arc-quenching filler are arranged in the outer compartments and in the inner compartment. The structure includes terminal elements for the outer compartments and terminal elements for the inner compartment. Outer compartment fuse link means of a current-limiting metal in each of said outer compartments conductively interconnect the terminal elements thereof. Inner compartment fuse link means of a current-limiting metal in said inner compartment conductively interconnect the terminals thereof. Both the outer compartment fuse link means and the inner compartment fuse link means have an overlay of a link-severing metal having a lower fusing point than said current-limiting metal. Said outer compartment fuse link means are adapted to fuse in accordance with a time-current characteristic having a predetermined geometry and having a relatively low minimum fusing current. Said inner compartment fuse link means is adapted to fuse in accordance with a time-current characteristic having substantially said predetermined geometry and a relatively high minimum fusing current whereby the difference in heat flow from said inner compartment fuse link means and said outer compartment fuse link means is substantially compensated and said outer compartment fuse link means and said inner compartment fuse link means are caused to form breaks substantially simultaneously at said link-severing overlay thereof when carrying substantially equal small overload currents.

BRIEF DESCRIPTION OF THE DRAWINGS

FIG. 1 is a top plan view of a load-break disconnect switch combined with a polyphase fuse embodying the present invention;

FIG. 2 is a side elevation of the structure of FIG. 1;

FIG. 3 is a section along III—III of FIG. 1;

FIG. 4 is an elevation of the polyphase fuse shown in FIG. 1, seen as shown in FIG. 1, but drawn on a larger scale;

FIG. 5 is an elevation of the structure of FIG. 4 drawn on the same scale as FIG. 4;

FIG. 6 is a section along VI—VI of FIG. 5 drawn on a larger scale than FIG. 5, a portion of the structure of FIG. 5 being broken away;

FIG. 7 is a section along VII—VII of FIG. 6;

DESCRIPTION OF PREFERRED EMBODIMENTS

Figure 8:
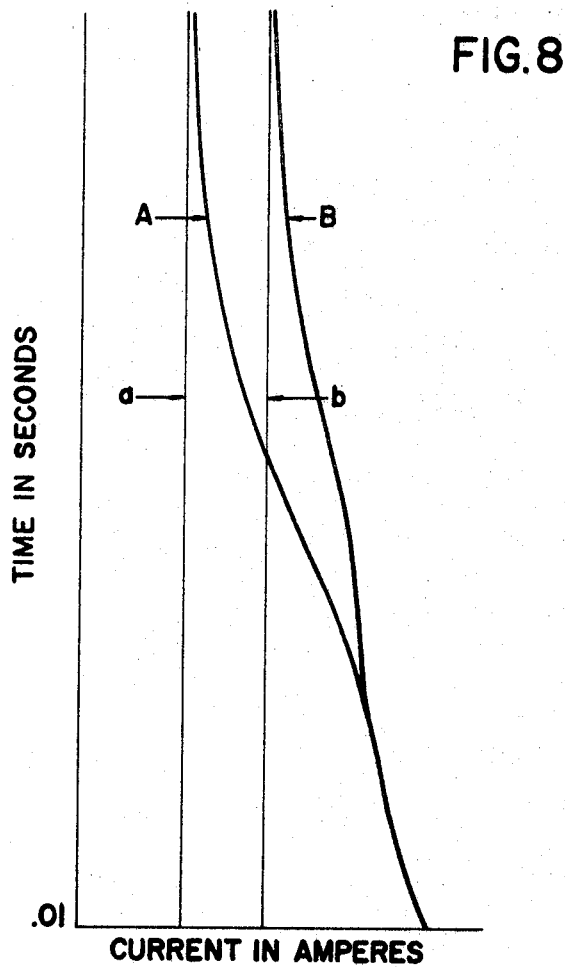
FIG. 8 shows the time-current characteristic of a polyphase fuse as shown in FIGS. 1–7, inclusive.

Referring now to the drawings, and more patricularly to FIGS. 1–3 thereof, reference numeral 1 has been applied to indicate a plate of insulating material supporting a load break disconnect switch generally indicated by reference numeral 2, and a polyphase fuse generally indicated by reference numeral 3. Switch 2 and fuse 3 are designed to control a three phase circuit whose phases will be referred to hereinafter by the letters R, S and T. Insulating plate 1 is rectangular and mounted in a rectangular frame 4 of metal. Shaft 6 operable by handle 5 is mounted in metal frame 4. Shaft 6 supports three crank levels 7 of which each operates a link 8. Each link 8 is pivotally connected to a blade contact 9. The right ends (as seen in FIGS. 1–3) of the three blade contacts 9 are pivotally supported by terminals 10 mounted on insulating plate 1. The left ends of blade contacts 9 engage cooperating fixed contacts 11 when the disconnect switch 2 is in the closed position thereof (FIGS. 1 and 2), and are separated from contacts 11 when the disconnect switch 2 is in the open position thereof (FIG. 3). Fixed contacts 11 are arranged inside of arc chutes 12 including an outer prismatic housing of insulating material for stack 13 of spaced arc-quenching metal plates. The tops of housings 12 have V-shaped slots for the passage of blade contacts 9 to and away from fixed contacts 11, and the constituent metal plates of stacks 13 have likewise V-shaped slots for the passage of blade contacts 9 to and away from fixed contacts 11. Fixed contacts 11 are supported by metal strips 14 provided with terminals 15. The right ends of blade contacts 9 are conductively connected, e.g., by flexible braided conductors (not shown), to terminals 10. These conductive connections are intended to minimize the voltage drop between contacts 9 and terminals 10. Reference numeral 16 has been applied to indicate three angle members of metal, each supporting one of terminals 10, and one of three abutments 17 for six helical biasing springs 18 for six finger contacts 19. Each terminal 10 is associated with one angle member 16, and each angle member 16 is engaged by the lower ends of one pair of finger contacts 19. The left side (as seen in FIGS. 1–3) of the polyphase fuse 3 is provided with three terminal plates 20 electrically insulated from one another. Each of terminal plates 20 is engaged by one end, or the upper end, of a pair of finger contacts 19 resting with the other or lower ends thereof against one of angle members 16. As seen in FIGS. 1–3, inclusive, the right side of polyphase fuse 3 is provided with three terminal plates 21 each engaged by a pair of finger contacts 22 under the bias of a pair of helical springs 23. Each of finger contacts 22 has an end, or lower end, resting against one of angle members 25 provided with a terminal means 26. Opposite pairs of terminal plates 20, 21 are conductively interconnected by fuse link means arranged inside of polyphase fuse 3 which fuse link means will be described below more in detail.

The current path of each of three phases R, S, T of the structure of FIGS. 1–3 is as follows: terminals 15, metal strips 14, fixed contacts 11, movable blade contacts 9, terminals 10, angle members 16, finger contacts 19, terminal plates 20, fuse link means (not shown), terminal plates 21, finger contacts 22, angle members 25, terminal means 26.

Load-break switch 2 further includes a pair of parallel interphase barriers 27' of insulating material arranged at right angles to insulating plate 1 and separating the constituent parts of outer phases R, T of switch 2 from the constituent parts of its inner phase S. Barriers 27' are primarily intended to insulatingly separate the regions of the three arc chutes 12, but extend beyond these regions to the right, as seen in FIGS. 1–3.

Load-break switch 2 is opened by turning handle 5 in clockwise direction, as seen in FIGS. 2 and 3, and switch 2 is closed by turning handle 5 in counterclockwise direction.

Referring now to FIGS. 4 to 7, inclusive, the housing of polyphase fuse 3 is preferably formed by a block 27 of precompressed or densified asbestos cement. This is a material combining great mechanical strength, heat-resistance, resistance against heat-shock and a high thermal conductivity. Block 27 might be made of another inorganic insulating material having a thermal conductivity in excess of $30 \cdot 10^{-4}$ cal./sec./sq. cm., 1 (° C./cm.). Block 27 has nine bores 28 arranged in three groups each including three bores. The ends of bores 28 are closed by terminal elements or terminal plates 21, 22 flush with opposite surfaces of prismatic block 27. Each bore 28 is filled with a pulverulent arc-quenching filler 29, preferably quartz sand which has a high thermal conductivity. Each bore 28 houses a fuse link means generally indicated by reference numeral 30. In order to achieve long time lags appropriate to motor starting requirements fuse link means 30 are preferably of the kind more fully disclosed in U.S. Pat. 3,291,943 to Frederick J. Kozacka, Dec. 13, 1966, for Time-Lag Fuse With Ribbon Fuse Link Folded in Longitudinal and in Transverse Direction. Fuse link means 30 are of a current-limiting metal which is a generic term encompassing the metals silver and copper. Terminal plates 20, 21 have narrow slots for the passage of the axially outer ends or tabs of fuse link means 30. These ends, or tabs, are threaded through the aforementioned slots and bent 90 degrees to engage the outer surface of terminal plates 20, 21. The bent ends of fuse link means 30 are conductively connected to terminal plates 20, 21, either by solder joints, or spot welding. Fuse link 30 includes an axially inner portion which is V-shaped in cross-section (see FIG. 7), and has three transverse lines of circular perforations, establishing three serially connected regions, or points, of reduced cross-sectional area. A link-severing overlay 31 of a metal having a considerably lower fusing point than copper and/or silver is arranged immediately adjacent the center line of perforations of each fuse link means 30. Overlays 31 may be of tin, cadmium or indium. The arrangement of link-severing overlays 31 is preferably effected in accordance with the teachings of U.S. Pat. 2,988,620 to Frederick J. Kozacka, June 13, 1961, for Time-Lag Fuse. Each fuse link means 30 further includes a pair of axially outer connector tabs 32 formed by extensions of the flanges by which the V-shaped perforated center portion of fuse link means 30 is formed. Extensions 32 have a larger cross-sectional area than any point of reduced cross-sectional area of the perforated center portion. Consequently melting of fuse link means 30 resulting from the flow of major currents is always initiated in the perforated center portion of fuse link means 30, and never at the axially outer connector tabs 32. The connector tabs 32 of each fuse link means 30 are bent at first points adjacent the ends of the perforated center portion of fuse link means 30 in a direction generally longitudinally of bores 28 and forming a first pair of substantially hair-pin-shaped loops. The connector tabs 32 are further bent at second points remote from the perforated center portion of fuse link means 30 and form a second pair of substantially hair-pin-shaped loops whose axially outer ends are threaded through slots in terminal plates 20, 21, as explained above.

In order for the polyphase fuse which has been described above to operate properly in case of overloads as well as in case of short-circuits, certain additional requirements must be met which will be treated below more in detail.

While the structure of FIGS. 4–7 includes three bores 28 for each phase R, S, T of a polyphase circuit, and while it is very desirable to associate with each phase R, S, T several bores 28, a three phase fuse requires basically but three separate aligned compartments, including two outer compartments and an inner compartment sandwiched between the two outer compartments. The outer compartments are separated from the inner compartment by interphase partitions formed in the structure of FIGS. 6 and 7 by parts 27a between the line of inner bores 28 and the lines of outer bores 28. Interphase barriers 27' and interphase partitions 27a are arranged in parallel planes, each interphase partition 27a substantially in the same plane as one of interphase barriers 27'. There must be fuse link means in the outer compartments 28 and fuse link means in the inner compartments 28 which differ from the fuse link means in the outer compartments 28. The fuse link means in the outer compartments may be referred to as outer compartment fuse link means and the fuse link means in the inner compartment as inner compartment fuse link means. The outer compartment fuse link means must be constructed to melt, or to perform, in accordance with a time-current characteristic having a predetermined geometry and a relatively low minimum fusing current, and the outer compartment fuse link means must be constructed to melt, or to perform, in accordance with a time-current characteristic having substantially said predetermined geometry and a relatively high minimum fusing current. The terms low and high minimum fusing current as used in this context refer to minimum fusing currents determined when but the particular fuse link under investigation within the polyphase fuse structure is current-carrying. Casing, or block 27, and quartz filler 29, must have thermal properties causing substantial equalization of the time-current characteristic of said inner compartment fuse link means, and the time-current characteristic of said outer compartment fuse link means when said inner compartment fuse link means and said outer compartment fuse link means are simultaneously current-carrying.

The above has been illustrated in FIG. 8 showing blowing times, or melting times, plotted against overload currents and major fault currents in terms of RMS values, both scales being logarithmic. Reference character A has been applied to indicate the time-current characteristic of the outer compartment fuse link means. Time-current characteristic A has been established while the fuse link means in the inner compartment or bores 28 carry the same RMS current as the fuse link means in the outer compartment or bores 28. It is apparent from FIG. 8 that time-current characteristic A has a relatively small minimum fusing current, indicated by the ordinate $a$. Reference character B has been applied to FIG. 8 to indicate the time-current characteristic of the fuse link means 30 inside of the inner compartment or bores 28 when these fuse link means are current-carrying and the outer compartment fuse link means 30 are not current-carrying and reference character $b$ has been applied to indicate the minimum fusing current pertaining to characteristic B. Since the heat dissipation from the inner compartment fuse means 30 is far less than the heat dissipation from the outer compartment fuse link means 30 when both the inner compartment fuse link means and the outer compartment fuse link means are simultaneously current-carrying, the inner compartment fuse link means is derated under such conditions so that its time-current characteristic B becomes substantially identical with time-current characteristic A. Minimum fusing current $b$ becomes substantially identical to minimum fusing current $a$.

It ought to be understood that in drawing FIG. 8 the separation of time-current characteristics A and B has been exaggerated in the interest of greatest clarity. Characteristics A and B merge at a point corresponding to currents of such magnitude that melting times do not depend any longer significantly on the difference between heat dissipation from the inner compartment or bores 28, and the outer compartment of bores 28. The merger of time-current characteristics A and B may occur at fault currents resulting in melting times in excess of 0.01 sec. The region, wherein melting $i^2 \cdot t$ values are deemed to be constant for a given fuse design is limited to fault currents so large as to result in melting times of less than 0.01 sec. The outer compartment fuse link means 30 and the inner compartment fuse link means 30 have points of reduced cross-sectional area imparting to the outer compartment fuse link means and to the inner compartment fuse link means substantially the same melting $i^2 \cdot t$ values, and thus the outer compartment fuse link means and the inner compartment fuse link means will melt substantially simultaneously when subjected to the same fault current, causing melting in less than 0.01 sec. However melting occurs also substantially simultaneously for all currents in excess of minimum fusing current $a$.

There are several ways of achieving the conditions which are set forth above, and these will be considered below more in detail.

FIRST ALTERNATIVE

The difference between the outer fuse link means and of the inner fuse link means may be considered to be one of rating under identical heat dissipating conditions. The outer fuse link means and the inner fuse link means may include identical strips of a current-limiting metal and further include a link-severing overlay 31 of a lower fusing point metal, as shown in FIG. 6. The link-severing overlay 31 of the two outer fuse link means, i.e., those in the two outer compartments, or bores 28, may require relatively small time-temperature products for severing said outer fuse link means, and the overlay 31 of the inner fuse link means, i.e., that in the inner compartment, or bores 28, may have relatively large time-temperature products for severing said inner fuse link means. This condition may be met by using an overlay metal for the two outer fuse link means having a lower melting point than the overlay metal used for the inner fuse link means. When the inner fuse link means operates in the ambient conditions established by the structure of FIGS. 4–7, all fuse link means 30 have the same time-current characteristic as a result of their specific structural and operational differences.

The difference regarding the link-severing overlays 31 affects only the overload interrupting performance of the outer and inner fuse link means, but not their major fault current interrupting performance. Hence characteristics A and B are not spaced and separate in the major fault current range.

SECOND ALTERNATIVE

The outer fuse link means 30 may have points of minimum cross-sectional area imparting to said outer fuse link means a predetermined melting $i^2 \cdot t$ value, a predetermined time-current characteristic of type A of FIG. 8, and a relatively small minimum fusing current as minimum fusing current $a$ of FIG. 8. The inner fuse link means 30 in the inner bores 28 of block 27 may have a point of minimum cross-sectional area slightly larger in cross-sectional area than said points of minimum cross-sectional are of said outer fuse link means, imparting to the inner fuse link means a slightly larger melting $i^2 \cdot t$ value than that of the outer fuse link means. This can be achieved, for instance, by stamping the inner fuse link means from a slightly thicker sheet of current-limiting metal than said outer fuse link means. This can also be achieved by providing said inner fuse link means with a pattern of circular perforations being the same as that of the outer fuse link means, both fuse link means differing on account of the fact that the diameter of the perforations of the inner fuse link means is slightly smaller than that of the circular perforations of the outer fuse link means. As a result of the above, the inner fuse link means require a larger amount of heat for a given period of time to interrupt phase S than the outer fuse link means require to interrupt phases R and T of a three phase circuit. Since the inner fuse link means is heated by both outer fuse link means when all fuse link means carry the same RMS current, under such conditions all fuse link means have the same time-current characteristic.

If a short-circuit occurs across phases R and T, the fuse link means in these two phases R and T fuse simultaneously. On the other hand, if a short-circuit occurs either across phases R and S, or across phases S and T, the outer fuse link means in phases R and T melt prior to the inner fuse link means in phase S. The sequence of fusion is so rapid that the arc resulting from fusion and vaporization of the fuse link means in phases R or T, respectively, still persists at the time when an arc is kindled in phase S by melting and veporization of the inner fuse link means therein. The nature of the body of pulverulent arc-quenching filler 29 in the outer compartment or bore 28 is a factor largely determining the arcing times in the outer compartment or bores. The arc-quenching filler in outer compartments or bores must be selected in such a way that the arcing $i^2 \cdot t$ values of the two outer fuse link means exceed the melting $i^2 \cdot t$ values of the inner fuse link means.

THIRD ALTERNATIVE

Figure 9:
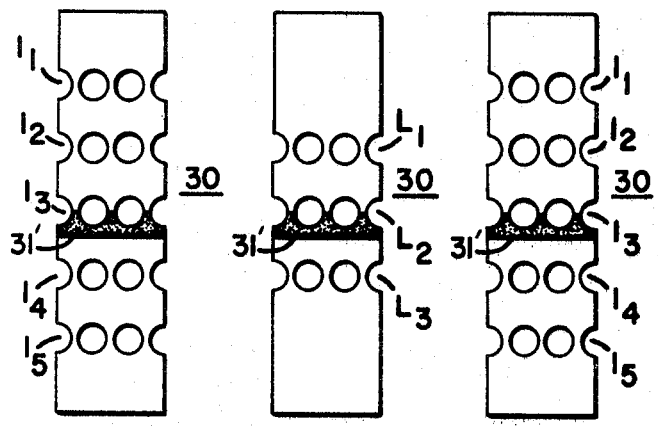
FIG. 9 shows in elevation three modified fuse link structures for the polyphase fuse shown in FIGS. 6 and 7.

An embodiment of three fuse link means 30' which might take the place of the three fuse link means 30 in the structure of FIG. 6 is shown in FIG. 9. The three fuse link means 30' are made up of strips of current-limiting metal having exactly the same width and exactly the same thickness, but being perforated in different fashions. Both outer fuse link means 30' and the inner fuse link means 30' have a link-severing overlay 31' having a lower fusing point than the current-limiting base metal by which it is supported. The outer fuse link means and the inner fuse link means each have a plurality of serially related points of reduced cross-sectional area imparting the same melting $i^2 \cdot t$ values to the outer fuse link means and to the inner fuse link means. In other words, the points of reduced cross-sectional area of the outer fuse link means and of the inner fuse link means have the same cross-sectional area. Therefore, on occurrence of major fault currents all fuse link means 30' will melt simultaneously. The points of reduced cross-sectional area of the two outer fuse link means 30' are formed by five transverse lines $1_1$, $1_2$, $1_3$, $1_4$ and $1_5$ of circular perforations, and the points of reduced cross-sectional area of inner fuse link means 30' are formed by but three lines $L_1$, $L_2$ and $L_3$ of circular perforations. Speaking more generally, the sum total of the serially related areas of reduced cross-section of each of said two outer fuse link means exceeds the sum total of the serially related areas of reduced cross-section of said inner fuse link means. As a result, less heat is generated in said inner fuse link means than in each of said outer fuse link means when said outer fuse link means and said inner fuse link means are carrying currents of the same magnitude, i.e., the same RMS currents. As a result of the smaller generation of heat in the inner fuse link means coupled with the heating of the inner fuse link means by the outer fuse link means, and the better cooling of the outer fuse link means than the inner fuse link means, the same time-current characteristics for the overload range may be imparted to all three fuse link means 30'.

On occurrence of short-circuit currents the arc voltage generated by arcing of the outer fuse link means exceeds the arc voltage generated by arcing of the inner fuse link means. In other words, short-circuits across phases R and T result in generation of higher arc voltages than short-circuits across phases R and S or S, T. This is not objectionable as long as the former are kept sufficiently low to preclude damage to any circuit component, and the latter are kept sufficiently high to limit arcing $i^1 \cdot t$ values to the required minimum. As a general rule, both conditions can readily be met simultaneously.

In connection with conventional panel boards where three separate fuse units for phases R, S, T are arranged side by side with relatively wide intervening air gaps, the performance of the inner fuse units may be affected by the presence of the two outer fuse units. In this particular instance this thermal imbalance is of a relatively limited degree. It would be impractical to compensate the aforementioned small imbalance by making different kinds of fuse units for the inner phase S and the outer phases R, T. In compact polyphase fuses the thermal imbalance of phases R, S, T in the overload range tends to be significant. Since polyphase fuses are factory sealed, tamper-proof units, there is no objection to having different fuse link structures in the inner compartment and in the outer compartment thereof.

It will be understood that I have illustrated and described herein preferred embodiments of my invention, and that various alterations may be made therein without departing from the spirit and scope of the appended claims.

I claim as my invention:

1. A polyphase fuse including in combination:
 (a) a casing of electric insulating material having two partitions and defining three separate contiguous compartments including two outer compartments and an inner compartment sandwiched between said two outer compartments;
 (b) separate bodies of a pulverulent arc-quenching filler in said two outer compartments and in said inner compartment;
 (c) terminal elements for said outer compartments and terminal elements for said inner compartment; and
 (d) outer compartment fuse link means of a current-limiting metal in each of said outer compartments conductively interconnecting said terminal elements thereof, inner compartment fuse link means of a current-limiting metal in said inner compartment conductively interconnecting said terminal elements thereof, said outer compartment fuse link means and said inner compartment fuse link means having points of reduced cross-sectional area imparting to said outer compartment fuse link means and to said inner compartment fuse link means substantially equal melting $i^2 \cdot t$ values, said outer compartment fuse link means and said inner compartment fuse link means each having an overlay of a link-severing metal having a lower fusing point than said current-limiting metal, and said outer compartment fuse link means each being adapted to form a break at said overlay thereof in accordance with a time-current characteristic having a predetermined geometry and a relatively low minimum fusing current, said inner compartment fuse link means each being adapted to form a break at said overlay thereof in accordance with a time-current characteristic having substantially said predetermined geometry and a relatively high minimum fusing current whereby the difference in heat flow from said inner compartment fuse link means and said outer compartment fuse link means is substantially compensated and said outer compartment fuse link means and said inner compartment fuse link means are caused to form breaks substantially simultaneously at said link-severing overlay thereof when carrying substantially equal small overload currents.

2. A polyphase fuse as specified in claim 1 wherein said outer compartment fuse link means and said inner compartment fuse link means include identical strips of a current-limiting metal and wherein each of said outer compartment fuse means has a link-severing overlay having a lower melting point than the melting point of said link-severing overlay of said inner compartment fuse link means.

3. A polyphase fuse as specified in claim 1 wherein each of said outer compartment fuse link means has a point of minimum cross-sectional area having a predetermined melting $i^2 \cdot t$ value and wherein said inner compartment fuse link means has a point of minimum cross-sectional area slightly larger in cross-sectional area than said point of minimum cross-sectional area of each of said outer compartment fuse link means and having a predetermined melting $i^2 \cdot t$ value slightly larger than said predetermined melting $i^2 \cdot t$ value of each of said outer compartment fuse link means, the arc-quenching ability of the bodies of said pulverulent arc-quenching filler in said outer compartments being selected to cause the arcing $i^2 \cdot t$ value of said outer compartment fuse link means to exceed said predetermined melting $i^2 \cdot t$ value of said inner compartment fuse link means.

4. A polyphase fuse as specified in claim 1 wherein each of said outer compartment fuse link means and said inner compartment fuse link means have a plurality of serially related points of reduced cross-sectional area imparting the same melting $i^2 \cdot t$ value to each of said outer compartment fuse link means and to said inner compartment fuse link means, the sum total of the serially related areas of reduced cross section of each of said outer compartment fuse link means exceeding the sum total of the serially related areas of reduced cross section of said inner compartment fuse link means to generate less heat in said inner compartment fuse link means than in said outer compartment fuse link means when each of said outer compartment fuse link means and said inner compartment fuse link means are carrying currents of the same magnitude.

5. A polyphase fuse as specified in claim 1 wherein said casing includes a block of inorganic insulating material having a higher thermal conductivity than $30 \cdot 10^{-4}$ cal./sec./sq. cm./1(° C./cm.), said block having a plurality of parallel lines of fuse-link-means receiving bores, each of said plurality of lines of bores including a plurality of bores having geometrical axes arranged in a common plane, each of said plurality of bores of each of said plurality of lines of bores being filled with quartz sand.

6. A combined disconnect switch and polyphase fuse including in combination:
 (a) a common frame structure;
 (b) three fixed contacts supported by said frame structure including a pair of outer fixed contacts and an inner fixed contact;
 (c) three movable contacts supported by said frame structure including a pair of outer movable contacts cooperating with said pair of outer fixed contacts and an inner movable contact cooperating with said inner fixed contact, said three movable contacts being pivotable each inside of one of three parallel planes;
 (d) a pair of interphase barriers each arranged in a plane parallel to said three parallel planes;
 (e) a polyphase fuse casing of electric insulating material including a pair of interphase partitions each arranged in registry with one of said pair of interphase barriers, said pair of interphase partitions defining at least three compartments including a pair of outer compartments and an inner compartment;
 (f) separate bodies of quartz sand in said pair of outer compartments and in said inner compartment;
 (g) terminal plates closing said pair of outer compartments and terminal plates closing said inner compartment;
 (h) outer compartment fuse link means of a current-limiting metal in each of said pair of outer compartments conductively interconnecting said terminal plates thereof, inner compartment fuse link means of a current-limiting metal in said inner compartment conductively interconnecting said terminal plates thereof, said outer compartment fuse link means and said inner compartment fuse link means each havig a overlay of a link-severing metal having a lower fusing point than said current-limiting metal, said outer compartment fuse link means and said inner compartment fuse link means having points of reduced cross sectional area imparting to said outer compartment fuse link means and to said inner compartment fuse link means substantially equal melting $i^2 \cdot t$ values, said outer compartment fuse link means being constructed to fuse in accordance with a time-current characteristic having a predetermined geometry and a relatively low minimum fusing current, said inner compartment fuse link means being constructed to fuse in accordance with a time-current characteristic having substantially said predetermined geometry and a relatively high fusing current when said inner compartment fuse link means is current-carrying and each of said outer compartment fuse link means are not current-carrying, said casing and said bodies of quartz sand having such a high thermal conductivity that the time-current-characteristic of said inner compartment fuse link means and the time-current characteristic of said outer compartment fuse link means are substantially equalized when said outer compartment fuse link means and said inner compartment fuse link means are simultaneously current-carrying.

7. A combined disconnect switch and polyphase fuse as specified in claim 1 wherein said polyphase fuse casing is of a block of asbestos cement having a plurality of lines of fuse-link-means-receiving bores, each of said plurality of lines of bores including a plurality of bores having geometrical axes arranged in a common plane parallel to said three parallel planes.

8. In a polyphase fuse including a substantially prismatic housing of insulating material, partitions inside said housing subdividing said housing into a plurality of compartments including an inner compartment sandwiched between a pair of outer compartments, separate bodies of a pulverulent arc-quenching filler in said inner compartment and in each of said pair of outer compartments, a pair of inner compartment terminal elements arranged at opposite sides of said inner compartment, a pair of outer compartment terminal elements arranged at oppositee sides of each of said pair of outer compartments, an inner compartment fuse link of a current-limiting metal arranged inside said inner compartment conductively interconnecting said pair of inner compartment terminal elements, a pair of outer compartment fuse links of a current-limiting metal each arranged in one of said pair of outer compartments and each conductively interconnecting a pair of said outer compartment terminal elements wherein said inner compartment fuse link and each of said pair of outer compartment fuse links has a neck portion imparting to said inner compartment fuse link and to said pair of outer compartment fuse links substantially equal melting $i^2 \cdot t$ values the novel feature consisting in that said outer compartment fuse links and said inner compartment fuse link each have an overlay of a link-severing metal having a lower fusing point than said current-limiting metal, and in that each said pair of outer compartment fuse links has means for imparting to each of said pair of outer compartment fuse links a smaller minimum fusing current than the minimum fusing current of said inner compartment fuse link so as to compensate for the difference in heat transfer from each of said outer compartment fuse links and said inner compartment fuse link and to thereby substantially equalize the time required to form breaks at said link-severing overlay of said pair of outer compartment fuse links and said inner compartment fuse link when said pair of outer compartment fuse links and said inner compartment fuse link carry substantially equal small overload currents.

9. In a polyphase fuse including a substantially prismatic housing of insulating material, partitions inside said housing subdividing said housing into a plurality of compartments including an inner compartment sandwiched between a pair of outer compartments, separate bodies of a pulverulent arc-quenching filler in said inner compartment and in each of said pair of outer compartments, a pair of inner compartment terminal elements arranged at opposite sides of said inner compartment, a pair of outer compartment terminal elements arranged at opposite sides of each of said pair of outer compartments, an inner compartment fuse link of a current-limiting metal arranged inside said inner compartment conductively interconnecting said pair of inner compartment terminals, a pair of outer compartment fuse links of a current-limiting metal each arranged in one of said pair of outer compartments and each conductively interconnecting a pair of said outer compartment terminal elements wherein said inner compartment fuse link and each of said pair of outer compartment fuse links has a neck portion imparting to said inner compartment fuse link and to said outer compartment fuse links substantially equal melting $i^2 \cdot t$ values the novel feature consisting in that each of said pair of outer compartment fuse links and said inner compartment fuse link are provided with an overlay of a link-severing metal having a substantially lower fusing point than said current-limiting metal to sever said current-limiting metal at a predetermined temperature below the fusing point thereof, and in that each of said pair of outer compartment fuse links includes means to impart to each of said pair of outer compartment fuse links a smaller minimum fusing current than the minimum fusing current of said inner compartment fuse link to compensate for the difference in heat transfer from each of said pair of outer compartment fuse links and from said inner compartment fuse link and to thereby substantially equalize the time required to form breaks at said overlay of said outer compartment fuse links and said inner compartment fuse link when said outer compartment fuse links and said inner compartment fuse link carry substantially equal overload currents.

10. In a polyphase fuse including a substantially prismatic housing of insulating material, partitions inside said housing subdividing said housing into a plurality of compartments including an inner compartment sandwiched between a pair of outer compartments, separate bodies of a pulverulent arc-quenching filler in said inner compartment and in each of said pair of outer compartments, a pair of inner compartment terminal elements arranged at opposite sides of said inner compartment, a pair of outer compartment terminal elements arranged at opposite sides of each of said pair of outer compartments, an inner compartment fuse link of a current-limiting metal arranged inside said inner compartment conductively interconnecting said pair of inner compartment terminal elements, a pair of outer compartment fuse links of a current-limiting metal each arranged in one of said pair of outer compartments and each conductively interconnecting a pair of said outer compartment terminal elements wherein said inner compartment fuse link and each of said pair of outer compartment fuse links has a neck portion imparting to said inner compartment fuse link and to said pair of outer compartment fuse links substantially equal melting $i^2 \cdot t$ values the novel feature consisting in that each of said pair of outer compartment fuse links and said inner compartment fuse link are provided with an overlay of a link-severing metal having a substantially lower fusing point than said current-limiting metal to sever said current-limiting metal at a predetermined temperature below the fusing point thereof, and in that each of said pair of outer compartment fuse links is provided with means for reducing the minimum fusing current thereof below the minimum fusing current of said inner compartment fuse link without affecting the substantial equality of the melting $i^2 \cdot t$ values of said pair of outer compartment fuse links and said inner compartment fuse link.

11. A polyphase fuse as specified in claim 10 wherein said minimum fusing current reducing means of each of said pair of outer compartment fuse links includes means for causing the time-current characteristic of each of said pair of outer compartment fuse links to deviate from the time-current characteristic of said inner compartment fuse link only at times above 0.01 sec. without affecting the substantial equality of the time-current characteristic of each of said pair of outer compartment fuse links and the time-current characteristic of said inner compartment fuse link at times in the order of 0.01 sec.

References Cited

UNITED STATES PATENTS

| | | |
|---|---|---|
| 2,800,554 | 7/1957 | Dannenberg et al. __ 337—244 X |
| 2,859,308 | 11/1958 | Dannenberg _____ 337—229 X |
| 3,281,555 | 10/1966 | Fister _____ 337—188 |
| 3,291,940 | 12/1966 | Kozacka et al. ____ 337—229 X |
| 3,319,027 | 5/1967 | Hitchcock _____ 337—276 |
| 3,342,962 | 9/1967 | Kozacka _____ 337—229 |

H. B. GILSON, Primary Examiner

U.S. Cl. X.R.

337—188